Jan. 10, 1933.  B. W. SEGARS  1,894,008
FERTILIZER DISTRIBUTOR
Filed April 13, 1931   3 Sheets-Sheet 1
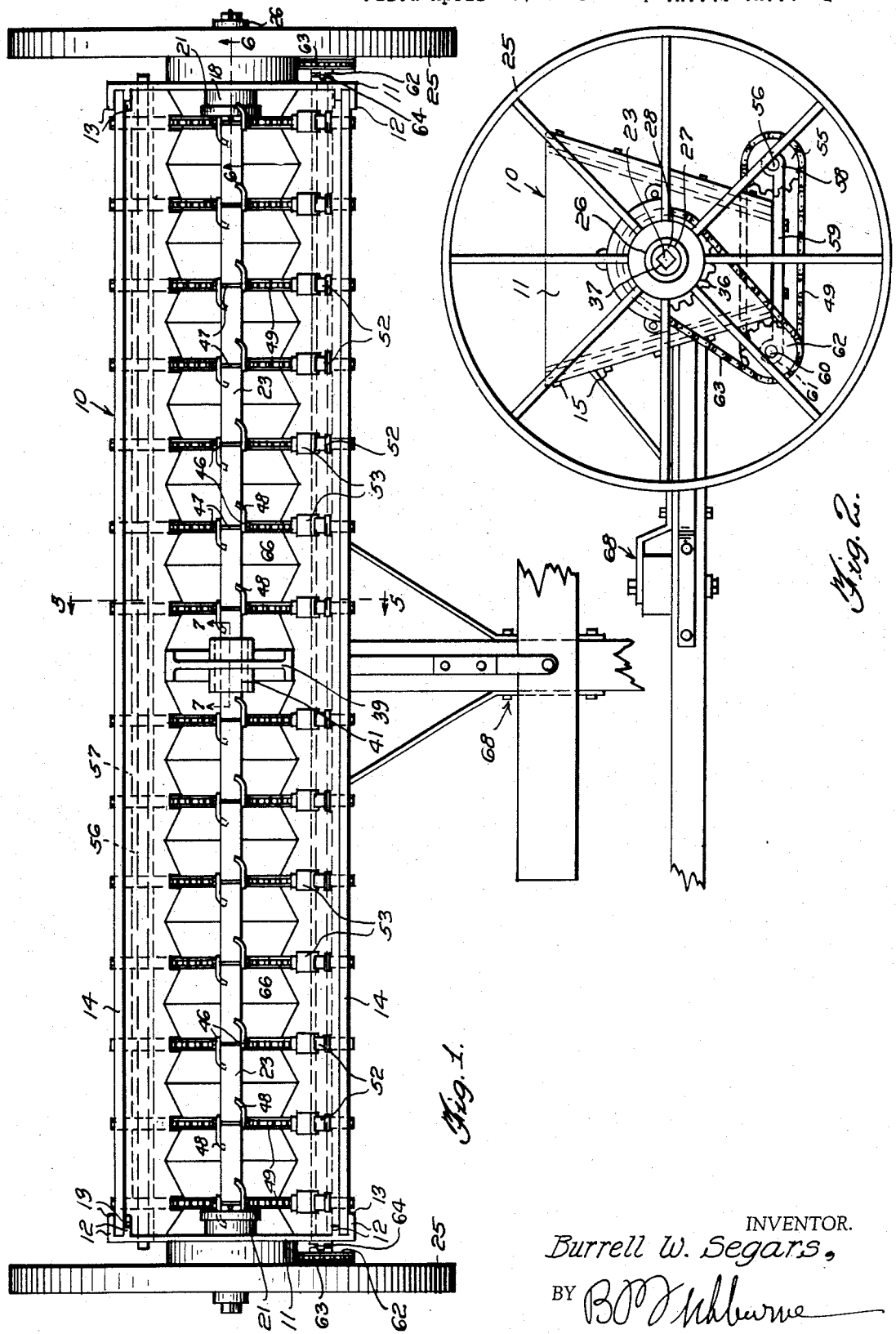
INVENTOR.
Burrell W. Segars,
BY
ATTORNEY.

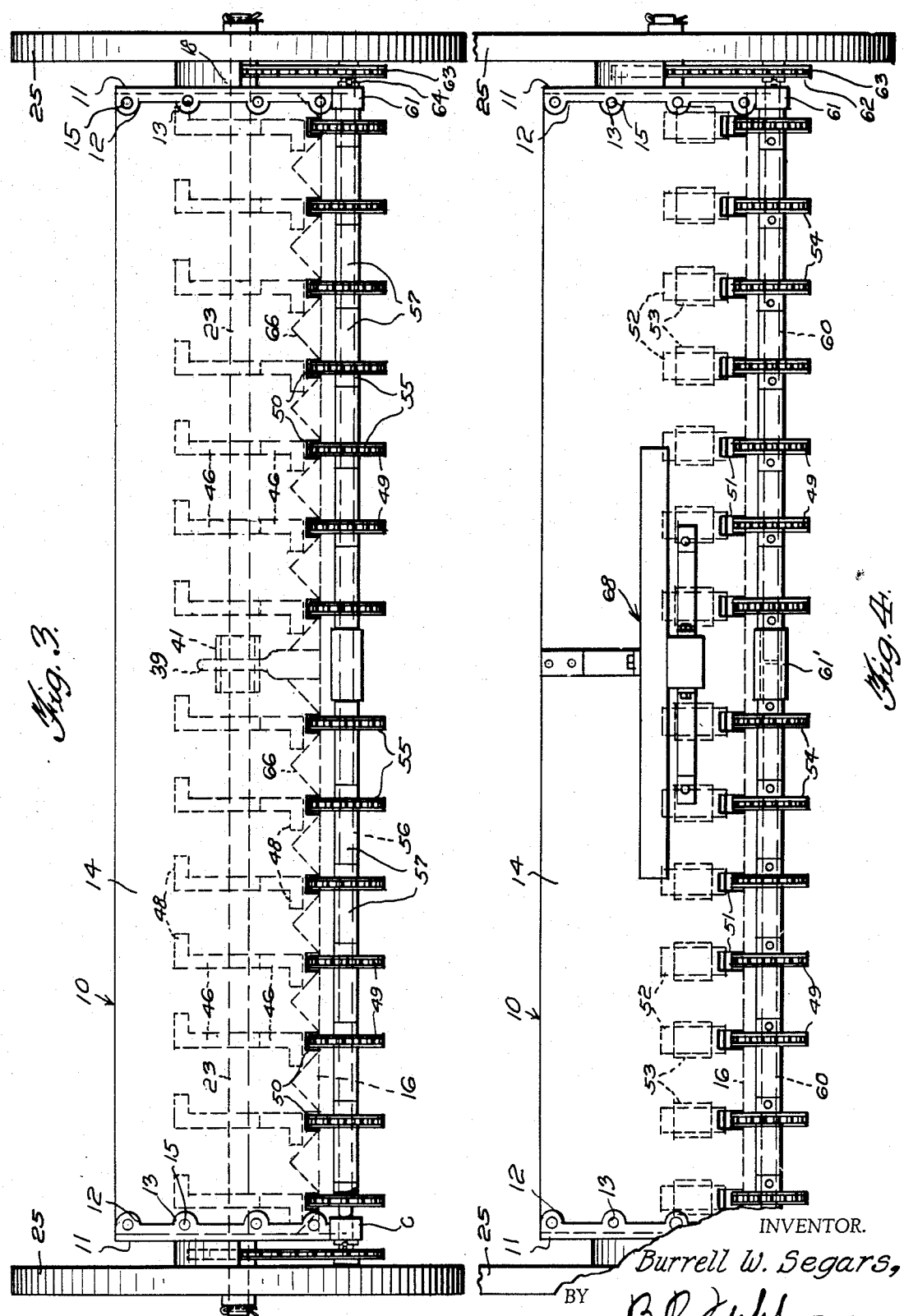

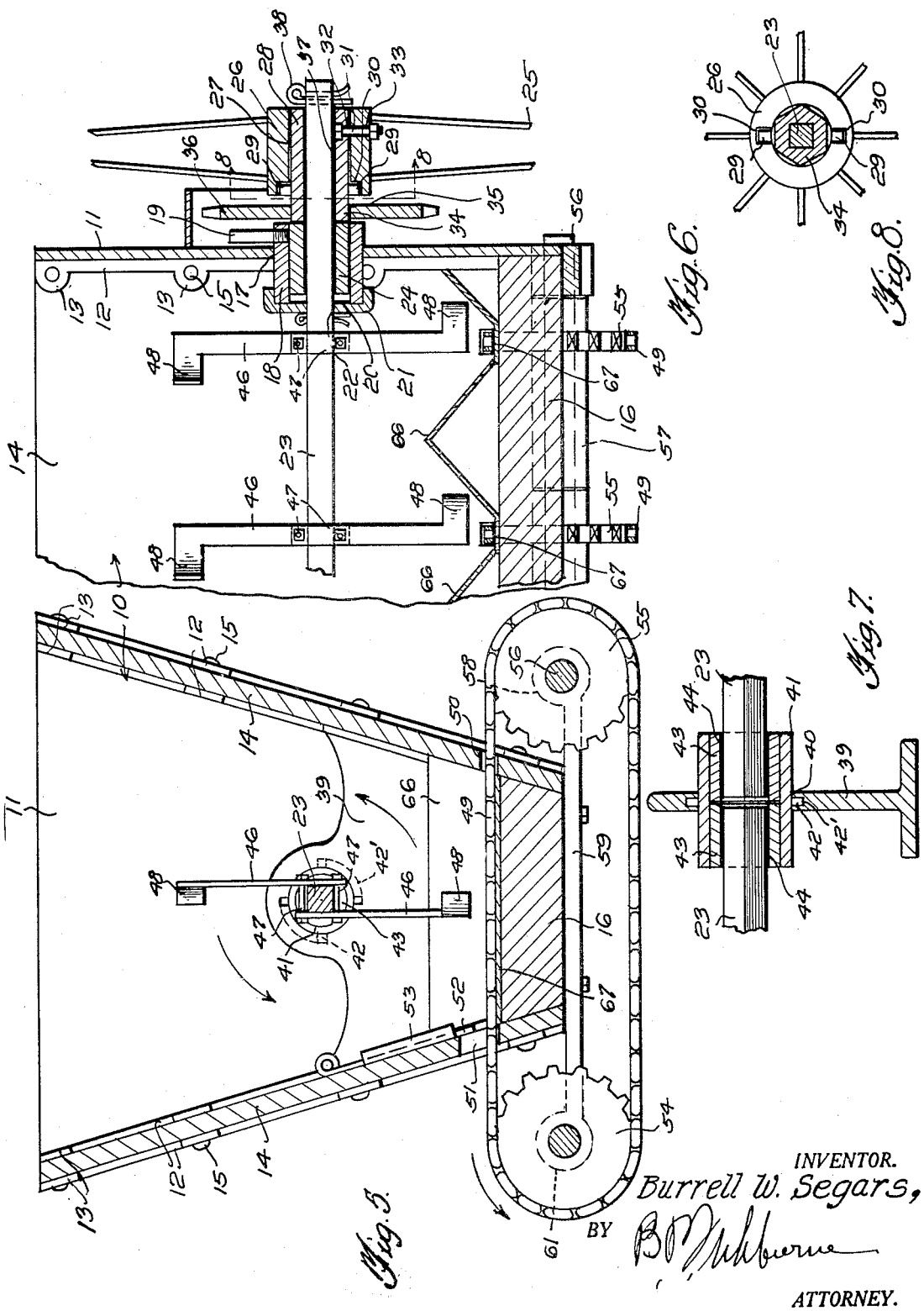

Patented Jan. 10, 1933

1,894,008

UNITED STATES PATENT OFFICE

BURRELL WASHINGTON SEGARS, OF OSWEGO, SOUTH CAROLINA

FERTILIZER DISTRIBUTOR

Application filed April 13, 1931. Serial No. 529,867.

My invention relates to improvements in fertilizer distributors.

In accordance with my invention, I provide a fertilizer distributor embodying a relatively long hopper, for receiving and holding the fertilizer. A plurality of chains, preferably sprocket chains, operate transversely through the hopper, near its bottom and serve to positively withdraw the fertilizer from the hopper and discharge the same upon the ground. These sprocket chains are, preferably, arranged suitably close together, so that when discharging the fertilizer upon the ground, they uniformly distribute the same over practically the entire area of the ground traversed by the hopper. The action of the sprocket chains is not only to withdraw the fertilizer from the hopper, but to distribute the same in a broadcasting manner, effecting an even and perfect distribution. The broadcasting action is effected by the fertilizer falling from the upper run of the sprocket chain and striking the lower run, and being deflected thereby. The use of the sprocket chains as a feeding means is important, as I have found that practically all types of fertilizers may be properly fed and discharged by the same, such fertilizers ranging from a powdered state to a lumpy state, or damp or sticky consistency. If there is any tendency for the fertilizer to accumulate in the openings of the upper run of the sprocket chain, it is removed from the same by the teeth of the sprocket wheel, when traveling about the same. I have found that if the discharge means embodying the sprocket chains are suitably spaced, at a distance of about six inches, the fertilizer will be uniformly distributed over the entire area of the ground. In order that the sprocket chains may properly function, I provide rotary agitators which operate within the hopper, near and above the sprocket chains, and these agitators prevent the fertilizer from caking or clogging, and coact with inclined deflectors to conduct the fertilizer in contact with the upper runs of the sprocket chains. I have also found that different types of fertilizer frequently require that the feeding sprocket chains be driven at different speeds for effecting proper distribution of the fertilizer. I have provided simple and reliable means whereby the gear ratio between the ground engaging wheels and the driving means for the sprocket chains, may be varied. In carrying out this means, I mount the ground-engaging wheel and driving sprocket wheel upon a common sleeve, so that they rotate as a unit, and this sleeve is mounted upon the axle of the machine. The arrangement is such that the ground-engaging wheel and driving sprocket wheel are removable as a unit, from the axle, subsequent to which the sprocket wheel may be removed from the sleeve and a sprocket wheel of different size placed thereon. The machine, as a whole, is of simple construction, strong, durable, and efficient in operation.

In the accompanying drawings forming a part of this specification, and in which like numerals are employed to designate like parts throughout the same, Figure 1 is a plan view of a fertilizer distributor embodying my invention, parts broken away.

Figure 2 is a side elevation of the same,

Figure 3 is a rear end elevation of the machine,

Figure 4 is a front end elevation,

Figure 5 is a transverse section taken on line 5—5 of Figure 1,

Figure 6 is a detail section taken on line 6—6 of Figure 1,

Figure 7 is a similar view taken on line 7—7 of Figure 1, and

Figure 8 is a detail section taken on line 8—8 of Figure 6.

In the drawings, wherein for the purpose of illustration is shown a preferred embodiment of my invention, the numeral 10 designates a hopper of the fertilizer distributor, as a whole. This hopper embodies ends 11, preferably castings, and these ends are tapered and decrease in width downwardly and have downwardly converging pairs of ribs or flanges 12. These flanges have apertured ears or lugs 13. The spaced flanges 12 receive therebetween the sides 14, of the hopper, preferably, formed of wood, and these sides are attached to the apertured ears 13 by bolts 15, or the like. The lower end of the hopper is closed by a bottom 16, preferably formed of wood, and this bottom is arranged between the sides 14, and may be attached thereto by screws, or other suitable means. It is, thus, seen that the hopper embodies ends 11, which are vertical, while the sides 14 are inclined and converge downwardly, and the bottom 16 is horizontally arranged.

The ends 11 of the hopper are provided with openings 17, receiving bearings 18, held stationary therein by any suitable means. These bearings are provided with tubes 19, whereby a lubricant may be applied to the interior of the bearings. The bearings 18 extend inwardly slightly beyond the ends 12, and project into cylindrical recesses 20, formed in dust guards 21, having openings 22, which are polygonal in cross-section.

The numeral 23 designates axle sections, which are square or polygonal in cross-section, and these axle sections extend through the openings 22 of the dust guards. The axle sections also extend through bearing sleeves or bushings 24, having openings which are polygonal in cross-section. These bearing sleeves or bushings are rotatable within the stationary bearings 18.

The ground-engaging wheels 25 are carried by the axle sections 23, in a manner to turn the axle sections. Each ground-engaging wheel embodies a hub 26, having a cylindrical opening 27, to receive a cylindrical coupling sleeve 28, having radial teeth 29 integral therewith, to enter recesses 30, formed in the inner end of the hub 26, so that these parts are locked for turning movement as a unit. The hub 26 is locked to the coupling sleeve 28 against relative longitudinal movement, by means of a bolt 31, or the like, passing through openings 32 and 33, as shown. The inner end of the coupling sleeve 28 projects inwardly beyond the hub 26, affording a portion 34, which is polygonal in cross-section and adapted to be inserted within a correspondingly shaped opening 35, formed in a driving sprocket wheel 36. It is, thus, seen that the sprocket wheel 35 and the ground-engaging wheel are both mounted upon the coupling sleeve 28, and turn as a unit, and are removable as a unit from the end of the axle section 23, the coupling sleeve 28 having a polygonal bore 37 to receive the axle section. The outer end of the axle section is provided with a transverse opening to receive a cotter pin 38, or the like, to hold the coupling sleeve upon the axle section. When it is desired to change the gear ratio between the ground-engaging wheel and the discharging mechanism, to be described, the traction wheel and driving sprocket wheel are readily removable, as a unit, so that the sprocket wheel may be removed from the coupling sleeve, and a sprocket wheel of different diameter placed thereon.

In order that the machine may be turned around, it is necessary that the axle sections 23 have a differential action, and means are provided for connecting the inner ends of the axle sections to permit of this differential action. This means, see more particularly Figures 1 and 7, embodies a vertical support 39, which is mounted within the hopper and rigidly secured thereto. This support has an opening 40 for receiving a bearing 41, having pins or lugs 42, adapted to be inserted within bayonet slots 42' formed in the support 39. Mounted within the bearing 41 are bearing sleeves or bushings 43, free to turn therein, and having openings 44, square in cross-section, to receive the inner ends of the axle sections 23, having a tight fit thereon. Particular attention is called to the fact that the wear between the several bearings may be readily compensated for by removing the bearing sleeves or bushings 24 and 43, and substituting new bearing sleeves or bushings.

Rotary agitators are arranged within the hopper in spaced relation and are rigidly mounted upon the axle sections 23, to be driven thereby. Each agitator, preferably, embodies a pair of radial arms or blades 46, engaging opposite sides of the axle section 23, and clamped thereto by transverse bolts 47, also engaging the axle section. At their outer ends, the arms or brace 46 are provided with lateral extensions 48, the ends of which are curved forwardly, as shown.

The fertilizer discharging elements embody sprocket chains 49, the upper runs of which operate near and above the bottom of the hopper, Figure 5. These upper runs travel through openings 50, and 51. The extent of the openings 51 may be regulated by adjustable slides 52, held in guides 53, the lower ends of these slides being adapted to be moved across the upper portion of the openings 51. These sprocket chains are mounted upon forward and rear sprocket wheels 54 and 55. The rear sprocket wheels 55 are rotatably mounted upon an idler shaft 56, with spacing elements or sleeves 57, arranged between the same to hold them in position. This idler shaft is journaled in bearings 58, formed upon transverse bars 59, rigidly attached to the bottom 16, of the hopper. The forward sprocket wheels 54 are divided into two groups, one group being rigidly mounted upon a rotatable shaft section 60 and the other group upon a corresponding shaft section 60. The outer ends of the shaft sections 60 are journaled within bearings 61, formed upon the forward ends of the bars 59. while the inner ends of the shaft sections 60 are journaled in a common bearing 61', carried by the intermediate bar 59. The shaft sections 60 are, therefore, capable of having a differential rotary action. The shaft sections 60 are rotated by means to be described, and are, preferably, driven in a direction to cause the upper runs of the sprocket chains 49 to travel forwardly, thereby engaging with the fertilizer and withdrawing a proper amount of the same and discharging the same through the openings 51. The sprocket wheels 54 are disposed a suitable distance in advance of the openings 51, so that, as the fertilizer is discharged through these openings, the same may fall from the upper run of the sprocket chains, and drop in whole or in part, upon the lower runs of the same, and be thereby deflected or spread by such contact. Further, in the event that any of the fertilizer should stick within the openings of the sprocket chains, the same will be discharged from such openings when the teeth of the sprocket wheels 54 enter the same. I have found that satisfactory results are obtainable by arranging the several sprocket chains at about six inches apart, and by this arrangement the fertilizer will be distributed uniformly over practically the entire surface of the ground being traversed, while the invention is not necessarily restricted to this precise dimension. The agitators are arranged the same distance apart as the sprocket chains, and are directly above the same and in alignment therewith. The lateral extensions of the agitator blades 46, extend transversely of the chains upon opposite sides of the same, and due to the slight curvature of these extensions, they serve to work the fertilizer inwardly, in opposite directions, toward and upon the upper run of the chain, in addition to keeping the fertilizer in a thoroughly agitated and divided state.

Rotatably mounted upon the outer end of each shaft section 60 is a sprocket wheel 62, driven by a sprocket chain 63, engaging the driving sprocket wheel 36. The sprocket wheel 62 is adapted to be locked and unlocked with and from the shaft section 60, by means of a clutch device 64, of any well known type. Arranged at the bottom 16 of the hopper are inverted V-shaped deflectors 66, having horizontal attaching flanges 67, secured to the bottom 16, by screws or the like. The attaching flange 67 of one deflector is arranged beneath and in contact with the free end of the next deflector. The upper runs of the sprocket chains travel within the depressions or valleys formed by these deflectors and travel over and in contact with the horizontal flanges 67. These inverted V-shaped deflectors further aid in guiding the fertilizer to the upper runs of the sprocket chains, and this action is aided by the operation of the extensions of the agitators, as explained.

Arranged in advance of the hopper 10, is a draft appliance 68, of any well known or preferred type, which is rigidly attached to the forward side of the hopper 10, at its center.

The operation of the machine is as follows:

The draft appliance may be employed to move the machine forwardly over the ground. The rotation of the ground-engaging wheels 25 is transmitted to the axle sections 23, which are turning counter-clockwise, Figure 2, and the upper runs of the sprocket chains 49 are traveling forwardly. These upper runs withdraw the fertilizer from the hopper and discharge the same through the openings 51, the fertilizer dropping from the upper runs and striking the lower runs of the sprocket chains and being further spread by the same. It has been found, by actual tests, that the sprocket chains, operating in conjunction with the associated elements, will discharge fertilizer of various types, and distribute the same upon the ground in a uniform manner. The differential action of the axle sections 23 and the shaft sections 60 permit the machine to be readily turned around at the end of the road. The machine is entirely automatic in operation and may be operated by unskilled labor.

It is to be understood that the form of my invention herewith shown and described, is to be taken as the preferred example of the same, but that various changes in the shape, size and arrangement of parts may be resorted to without departing from the spirit of my invention or the scope of the subjoined claims.

Having thus described my invention, what I claim is:

1. A fertilizer distributor comprising, a relatively long hopper having forward and rear sides provided with substantially equidistantly spaced openings, an idler shaft arranged exteriorly of and extending longitudinally upon one side of the hopper, drive shaft means arranged exteriorly of and extending longitudinally upon the opposite side of the hopper, bearing means for the idler shaft and drive shaft means and attached to the hopper, a set of sprocket wheels mounted upon the idler shaft, a set of sprocket wheels mounted upon the drive shaft means, sprocket chains engaging corresponding sprocket wheels in said sets, the upper runs of the sprocket chains being arranged near the bottom of the hopper and operating through the openings in said sides, axle sections connected with the ends of the hopper and disposed therein and extending longitudinally throughout substantially the entire length of the hopper and having their inner ends connected so that one axle section can turn with relation to the other axle section, agitators mounted upon the axle sections and arranged above the upper runs of the sprocket chains and corresponding in number and arrangement with relation thereto, ground-engaging wheels secured to the outer ends of the axles, and means driven by one wheel to drive the driving shaft means.

2. A fertilizer distributor comprising, a relatively long hopper having sides provided with openings, inverted V-shaped deflectors mounted upon the bottom of the hopper, each deflector having a horizontal attaching flange and a free end to engage with the top of the attaching flange of the companion deflector, the deflectors being so arranged within the hopper that downwardly tapering recesses are formed therein which are in substantial alignment with the openings in said sides, spaced feeding devices embodying sprocket chains extending transversely of the hopper with their upper runs extending through the hopper and operating within said openings and recesses and slidably contacting with the attaching flanges of the deflectors, rotary agitators arranged within the hopper and corresponding in number and arrangement with the upper runs of the sprocket chains, means to drive the agitators, and means to drive the feeding devices.

3. A fertilizer distributor comprising a hopper having sides provided with openings and a bottom, inverted V-shaped deflectors mounted upon the bottom of the hopper and affording downwardly tapering valleys between the deflectors, sprocket chains operating through said openings and the bottoms of the valleys, wheels for supporting the hopper, means driven by the wheels to operate the sprocket chains, driving means extending longitudinally through the hopper above and spaced from the deflectors, and agitators carried by the driving means and corresponding in number and arrangement to the sprocket chains, each agitator comprising radial arms, each arm being of a length so that its outer end will travel in close relation to the sprocket chain and below the top of the deflector, and each arm being provided at its free end with a laterally extending blade.

In testimony whereof I affix my signature.

BURRELL WASHINGTON SEGARS.